United States Patent
Suenaga

(10) Patent No.: US 10,214,161 B2
(45) Date of Patent: Feb. 26, 2019

(54) WIRE HOUSING PROTECTOR

(71) Applicant: Sumitomo Wiring Systems, Ltd., Yokkaichi, Mie (JP)

(72) Inventor: Ryo Suenaga, Mie (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 0 days.

(21) Appl. No.: 15/738,689

(22) PCT Filed: Aug. 20, 2015

(86) PCT No.: PCT/JP2015/073365
§ 371 (c)(1),
(2) Date: Dec. 21, 2017

(87) PCT Pub. No.: WO2017/006491
PCT Pub. Date: Jan. 12, 2017

(65) Prior Publication Data
US 2018/0186313 A1    Jul. 5, 2018

(30) Foreign Application Priority Data
Jul. 6, 2015 (JP) .................. 2015-135662

(51) Int. Cl.
*F16L 55/00* (2006.01)
*B60R 16/02* (2006.01)
*H02G 3/04* (2006.01)

(52) U.S. Cl.
CPC ....... *B60R 16/0215* (2013.01); *H02G 3/0418* (2013.01); *H02G 3/0437* (2013.01); *H02G 3/0487* (2013.01)

(58) Field of Classification Search
CPC .. H02G 3/0418; H02G 3/0437; H02G 3/0487; B60R 16/0215
(Continued)

(56) References Cited

U.S. PATENT DOCUMENTS 3,055,399 A * 9/1962 Bush ................ B21C 23/08
138/157
3,126,444 A * 3/1964 Taylor ............... H02G 3/0418
138/163
(Continued)

FOREIGN PATENT DOCUMENTS

JP    H0670415 U    9/1994
JP    H0937432 A    2/1997
(Continued)

OTHER PUBLICATIONS

International Search Report for Application No. PCT/JP2015/073365 filed Nov. 17, 2015; 4 pages.

*Primary Examiner* — James F Hook
(74) *Attorney, Agent, or Firm* — Reising Ethington, P.C.

(57) ABSTRACT

A wire housing protector in which a locking mechanism includes an elastic projecting piece provided in a lid with an engagement protrusion on an outer surface of its leading end, and an elastic projecting piece insertion portion that is provided in a side wall of the protector body, and includes an engagement portion that engages with the engagement protrusion, contact surfaces include first engagement surfaces that each extend from the side wall side of the protector body toward a side to which the engagement protrusion protrudes, second engagement surfaces that extend from end portions of the first engagement surfaces toward the lid side, and third engagement surfaces that extend from end portions of the second engagement surfaces toward the side to which the engagement protrusion protrudes.

3 Claims, 7 Drawing Sheets

(58) Field of Classification Search
USPC ......... 138/108, 162, 166, 167, 168; 174/504
See application file for complete search history.

(56) References Cited

U.S. PATENT DOCUMENTS

| | | | | |
|---|---|---|---|---|
| 3,495,306 | A * | 2/1970 | Eichberg | A44B 19/16 |
| | | | | 138/168 |
| 3,757,031 | A * | 9/1973 | Izraeli | H02G 15/113 |
| | | | | 138/155 |
| 4,647,715 | A * | 3/1987 | Butler | H02G 15/117 |
| | | | | 138/166 |
| 4,891,471 | A * | 1/1990 | Ono | H02G 3/0418 |
| | | | | 138/166 |
| 5,566,722 | A * | 10/1996 | Bartholomew | B29C 49/00 |
| | | | | 138/121 |
| 6,084,180 | A * | 7/2000 | DeBartolo, Jr. | H02G 3/0431 |
| | | | | 174/101 |
| 7,119,275 | B2 * | 10/2006 | Suzuki | H02G 3/0691 |
| | | | | 174/503 |
| 2014/0102744 | A1 | 4/2014 | Suenaga | |
| 2016/0280158 | A1 * | 9/2016 | Fujita | H01B 7/0045 |
| 2018/0186314 | A1 * | 7/2018 | Suenaga | H02G 3/0418 |
| 2018/0205209 | A1 * | 7/2018 | Suenaga | B60R 16/0215 |
| 2018/0205210 | A1 * | 7/2018 | Suenaga | B60R 16/0215 |

FOREIGN PATENT DOCUMENTS

| | | | |
|---|---|---|---|
| JP | 2012152030 | A | 8/2012 |
| JP | 2014082880 | A | 5/2014 |
| JP | 2014183690 | A | 9/2014 |

* cited by examiner

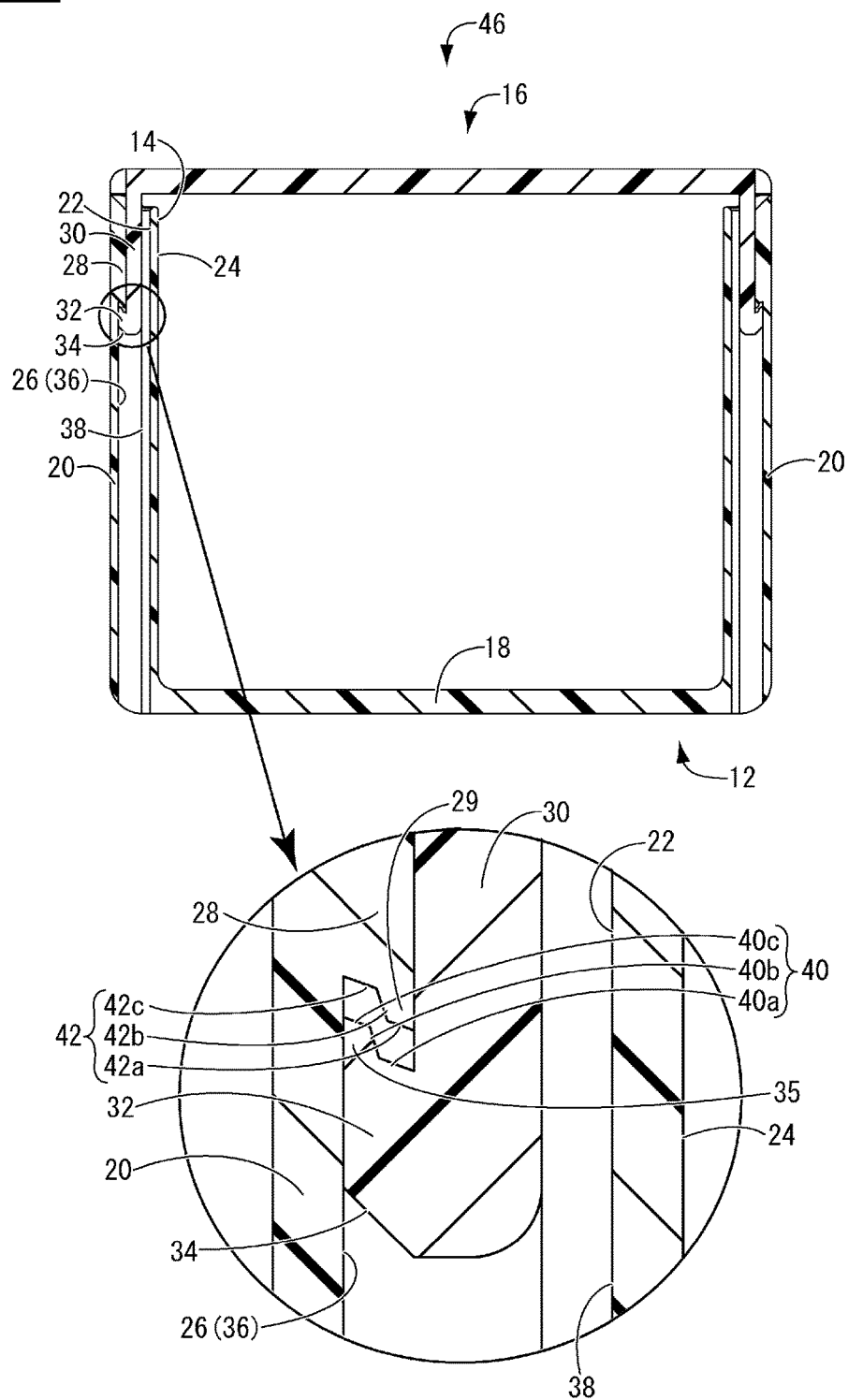

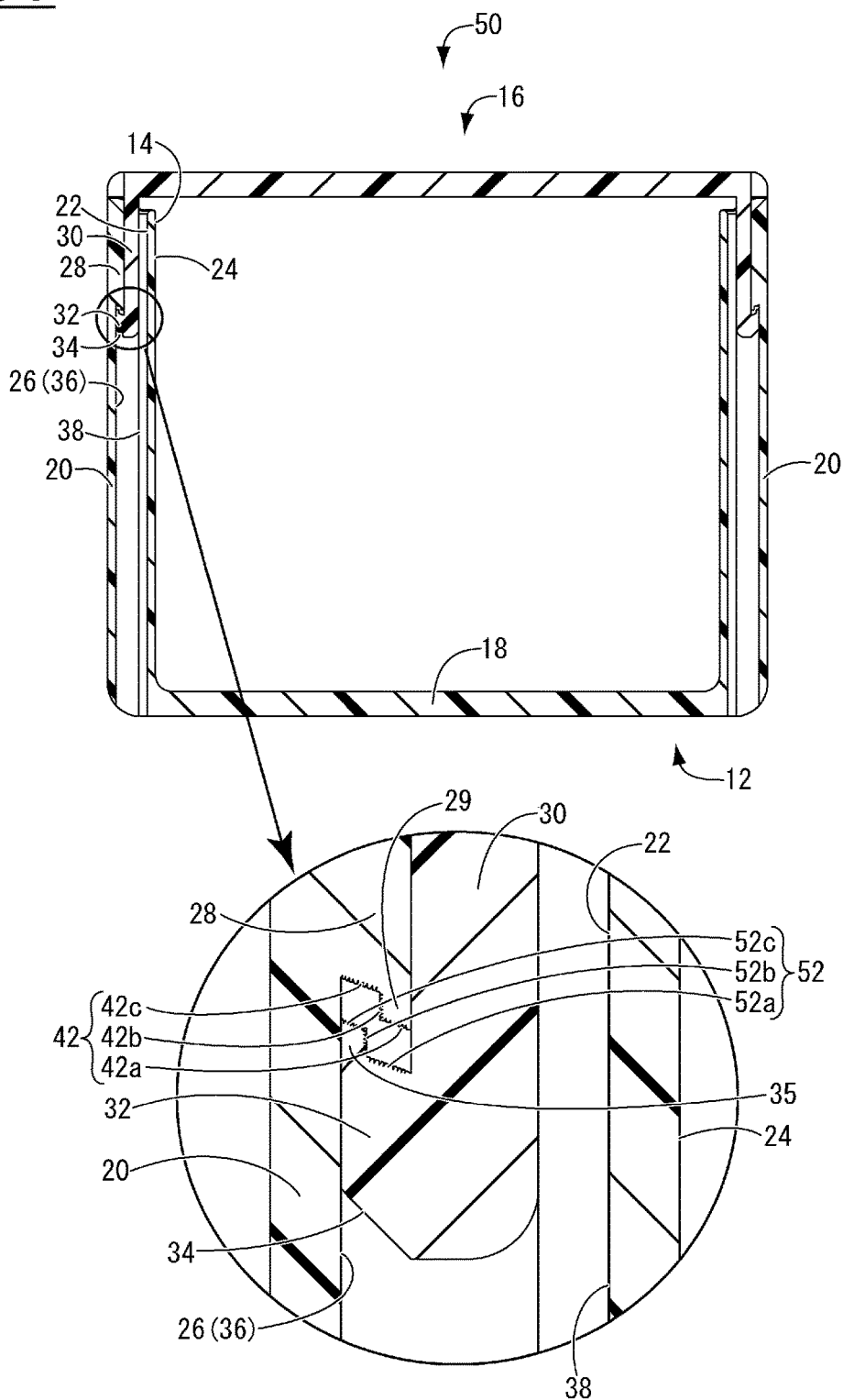

WIRE HOUSING PROTECTOR

CROSS REFERENCE TO RELATED APPLICATIONS

This application claims the priority of Japanese patent application JP2015-135662 filed on Jul. 6, 2015, the entire contents of which are incorporated herein.

TECHNICAL FIELD

The present invention relates to a wire housing protector for holding multiple electric wires laid therethrough that are routed inside an automobile or the like.

BACKGROUND ART

Conventionally, in the electric system of automobiles or the like, multiple routed electric wires are laid through and held within a wire housing protector and secured at suitable locations in order to protect the electric wires from external members that might otherwise interfere with the electric wires and restrict the routing of the electric wires.

Incidentally, as described in JP H06-70415U (Patent Document 1) for example, such a wire housing protector is constituted by a trough-shaped protector body and a lid that covers the upper opening of the protector body. Once multiple electric wires are laid through the protector body, the lid is fixed to the protector body by a locking mechanism that protrudes from a sidewall of the protector body. In this way, the protector is capable of fixedly holding the multiple electric wires accommodated therein.

Specifically, an elastic projecting piece is provided at an outer peripheral edge of the lid and protrudes toward the protector body, and an elastic projecting piece insertion portion having a frame shape is provided in a side wall of the protector body. A claw-shaped engagement protrusion is provided on an outer surface of its leading end of the elastic projecting piece, and when the elastic projecting piece is inserted into the elastic projecting piece insertion portion, the engagement protrusion is brought into contact with a side surface of the elastic projecting piece insertion portion, and the leading end of the elastic projecting piece is elastically deformed and is pressed toward an inner surface side. Accordingly, the elastic projecting piece is allowed to be inserted into the elastic projecting piece insertion portion. Furthermore, when the elastic projecting piece is inserted up to an insertion end position, contact of the engagement protrusion to the side surface of the elastic projecting piece insertion portion is released, and the elastic projecting piece undergoes elastic restoration. Accordingly, the engagement protrusion is arranged directly under the engagement portion that is provided in a lower portion of the elastic projecting piece insertion portion, and the engagement protrusion can engage with the engagement portion. When a force is applied to the lid in a direction such that the lid separates from the protector body, the engagement protrusion engages with the engagement portion, and as a result, the separation of the lid is inhibited and the lid is held by the protector body.

However, in such a locking mechanism having a conventional structure, when a very strong upward force is applied to the lid in a direction separating it from the protector body, the engagement protrusion is pulled while inclining obliquely upward as the elastic projecting piece moves upward, and there is a risk that the lid separates from the engagement portion.

Therefore, the applicant proposed, in JP 2014-183690A (Patent Document 2), a structure in which a protrusion that rises vertically upward from a projection leading end of the engagement protrusion is provided, and the separation of the engagement protrusion from the engagement portion is inhibited as a result of causing the protrusion to engage with an outer surface of the elastic projecting piece insertion portion. However, with the increasing demand for higher component density and space saving in vehicles in recent years, further improvement of the locking mechanism that can exert a strong retaining force without increasing the size has been demanded.

SUMMARY

The present design has been made in view of the above-described circumstances and, as a solution to the problem, provides a wire housing protector having a new structure in which the retaining force of a locking mechanism with which a lid is held by a protector body can be increased without increasing the size thereof.

A first aspect of the design provides a wire housing protector including: a protector body extending in the shape of a trough; a lid for covering an upper opening of the protector body; and a locking mechanism for fixedly holding the protector body and the lid. The locking mechanism includes: an elastic projecting piece that protrudes from the lid and is provided with an engagement protrusion on an outer surface of its leading end; and an elastic projecting piece insertion portion that is provided in a side wall of the protector body, and includes an engagement portion that engages with the engagement protrusion. The elastic projecting piece can be inserted into the elastic projecting piece insertion portion while the leading end of the elastic projecting piece is pressed toward an inner surface side, and when the elastic projecting piece elastically returns, the engagement protrusion engages with the engagement portion and the lid is held by the protector body. Contact surfaces of the engagement protrusion and the engagement portion each include a first engagement surface that extends from the side wall side of the protector body toward a side to which the engagement protrusion protrudes, a second engagement surface that extends from an end portion of the first engagement surface toward the lid side, and a third engagement surface that extend from an end portion of the second engagement surface toward the side to which the engagement protrusion protrudes.

According to the present aspect, contact surfaces of the engagement protrusion provided in the elastic projecting piece of the lid and the engagement portion provided in the elastic projecting piece insertion portion of the protector body each include three engagement surfaces. Specifically, the first engagement surfaces extend in a direction directed from the side wall side of the protector body toward the protruding side of the engagement protrusion, that is, in a direction that is approximately orthogonal to a direction in which the elastic projecting piece separates from the elastic projecting piece insertion portion, and as a result, stopping power such that the separation of the lid from the protector body is inhibited can be exerted. Furthermore, since the second engagement surfaces that are continuous to the respective first engagement surfaces are surfaces that rise upward toward the lid side, when an upward force is applied such that the elastic projecting piece separates from the elastic projecting piece insertion portion, the second engagement surfaces are brought into contact to each other, and stopping power is exerted such that the displacement of the elastic projecting piece toward the inside of the protector body is inhibited, and as a result, the separation of the elastic projecting piece from the elastic projecting piece insertion portion can be advantageously inhibited. In addition, in the present aspect, the third engagement surfaces that are continuous to the respective second engagement surfaces extend in a direction that is approximately orthogonal to the direction in which the elastic projecting piece separates from the elastic projecting piece insertion portion, similarly to the first engagement surfaces, and as a result, stopping power can be exerted such that the separation of the lid from the protector body can be stably inhibited on both sides of the respective second engagement surfaces. In particular, because the structure in which the engagement protrusion engages with the engagement portion at a position outside the second engagement surfaces has not been adopted in a conventional structure, the stability of engagement between the engagement protrusion and the engagement portion can be further securely improved by increasing the contact area between the engagement protrusion and the engagement portion. Also, the third engagement surface of the engagement portion is provided using a dead space above the protrusion that forms the second engagement surface, which has been already adopted in the structure of Patent Document 2, and as a result, the retaining force of the locking mechanism can be increased without increasing the overall size, and the demand for saving space can be advantageously dealt with.

A second aspect of the design provides the wire housing protector described in the first aspect in which the first engagement surfaces and the third engagement surfaces of the engagement protrusion and the engagement portion are sloping surfaces that slope obliquely downward toward the inside of the protector body.

According to the present aspect, the first engagement surfaces and the third engagement surfaces of the engagement protrusion and the engagement portion are sloping surfaces that slope obliquely downward toward the inside of the protector body. Accordingly, when an upward force is applied such that the elastic projecting piece separates from the elastic projecting piece insertion portion, forces are generated such that the second engagement surfaces approach each other on both sides of the second engagement surfaces by component forces of the applied force due to the sloping surfaces. As a result, the second engagement surfaces come into contact more securely, and stopping power for inhibiting a displacement of the elastic projecting piece toward the inside of the protector body is exerted, and as a result, the separation of the elastic projecting piece from the elastic projecting piece insertion portion can be more securely inhibited, and the improvement of the retaining force of the locking mechanism can be more advantageously realized.

A third aspect of the design provides the wire housing protector described in the first or second aspect in which at least one pair of engagement surfaces out of a pair of the first engagement surfaces, a pair of the second engagement surfaces, and a pair of the third engagement surfaces of the engagement protrusion and the engagement portion have a corrugated cross-sectional shape.

According to the present aspect, at least one of the pair of first engagement surfaces, the pair of second engagement surfaces, and the pair of third engagement surfaces of the engagement protrusion and the engagement portion that oppose each other when engaged have a corrugated cross-sectional shape. Accordingly, when the engagement protrusion engages with the engagement portion, because at least one pair of engagement surfaces that have a corrugated cross-sectional shape are fitted to each other, the contact area between the engagement protrusion and the engagement portion increases without increasing the size of the protector, and as a result, the force to retain engagement between the engagement protrusion and the engagement portion can further be increased. Therefore, a locking mechanism in which the retaining force is increased can be advantageously provided even in a small arrangement space.

A fourth aspect of the design provides the wire housing protector described in any one of the first to third aspects in which the elastic projecting piece insertion portion is constituted, in the side wall of the protector body, by a hole that extends inside the side wall in a height direction and opens in an upper surface of the side wall, and the engagement portion is provided at an inner surface of an outer wall of the hole.

According to the present aspect, since the elastic projecting piece insertion portion is constituted by a hole that passes through inside the side wall of the protector body, the side wall of the protector body can be extended to a maximum range of the space that is allowed to mount the wire housing protector, compared with a case where the elastic projecting piece insertion portion protrudes outward from the side wall of the protector body in a frame shape. Therefore, the dead space generated in the vicinity of the protector body due to the elastic projecting piece insertion portion having a frame shape that protrudes outward of the side wall can be reduced, and the space for accommodating wires inside the protector body can be maximized.

Furthermore, when the elastic projecting piece insertion portion is provided inside the side wall of the protector body in this way, the sizes of the engagement protrusion and the engagement portion are restricted. However, in the present aspect, as a result of adopting the configuration described in any one of the aspects, even in a case where a relatively small engagement protrusion and an engagement portion are provided in a small space, the stability of engagement between the engagement protrusion and the engagement portion can be sufficiently increased by adopting the first to third engagement surfaces in combination, and the locking mechanism constituted by the engagement protrusion and the engagement portion having a strong retaining force can be provided in a small space.

According to the present design, contact surfaces of the engagement protrusion provided in the elastic projecting piece of the lid and the engagement portion provided in the elastic projecting piece insertion portion of the protector body each have three engagement surfaces. Specifically, the first engagement surfaces extend in a direction that is approximately orthogonal to a direction in which the elastic projecting piece separates from the elastic projecting piece insertion portion, and as a result, stopping power can be exerted such that the separation of the lid from the protector body is inhibited. Also, because the second engagement surfaces are surfaces that rise upward toward the lid side, when an upward force is applied such that the elastic projecting piece separates from the elastic projecting piece insertion portion, the second engagement surfaces come into contact with each other, stopping power is exerted such that the displacement of the elastic projecting piece toward the inside of the protector body is inhibited, and as a result, the separation of the elastic projecting piece from the elastic projecting piece insertion portion can be advantageously inhibited. Furthermore, because the third engagement surfaces extend in a direction that is approximately orthogonal to the direction in which the elastic projecting piece separates from the elastic projecting piece insertion portion, similarly to the first engagement surfaces, stopping power can be exerted such that the separation of the lid from the protector body is inhibited on both sides of the second engagement surfaces. Moreover, compared with a conventional case where a structure in which the engagement protrusion engages with the engagement portion outside the second engagement surfaces is not adopted, the contact area between the engagement protrusion and the engagement portion can be increased, and as a result, the stability of engagement between the engagement protrusion and the engagement portion can further be securely improved. Also, the third engagement surfaces are provided using a dead space above the protrusion, which has been already adopted in the structure in Patent Document 2, that forms the second engagement surfaces, and as a result, the retaining force of the locking mechanism can be increased without increasing the overall size.

BRIEF DESCRIPTION OF DRAWINGS

FIG. 6 is a cross-sectional view of a wire housing protector according to a second embodiment, which corresponds to FIG. 4.
FIG. 7 is a cross-sectional view of a wire housing protector according to a third embodiment, which corresponds to FIG. 4.

DESCRIPTION OF EMBODIMENTS

Hereinafter, embodiments of the present design will be described with reference to the drawings.

First, a wire housing protector 10 according to a first embodiment is shown in FIGS. 1 to 5. The wire housing protector 10 is constituted by a protector body 12 extending in the shape of a trough and a lid 16 that covers the upper opening 14 of the protector body 12. When in use, the wire housing protector 10 accommodates a wire harness (not shown) laid through the protector body 12. Also, in the following description, "upward" refers to the upward direction in FIG. 1, "downward" refers to the downward direction in FIG. 1, "forward" refers to the leftward direction in FIG. 1, and "backward" refers to the rightward direction in FIG. 1.

Figure 2:
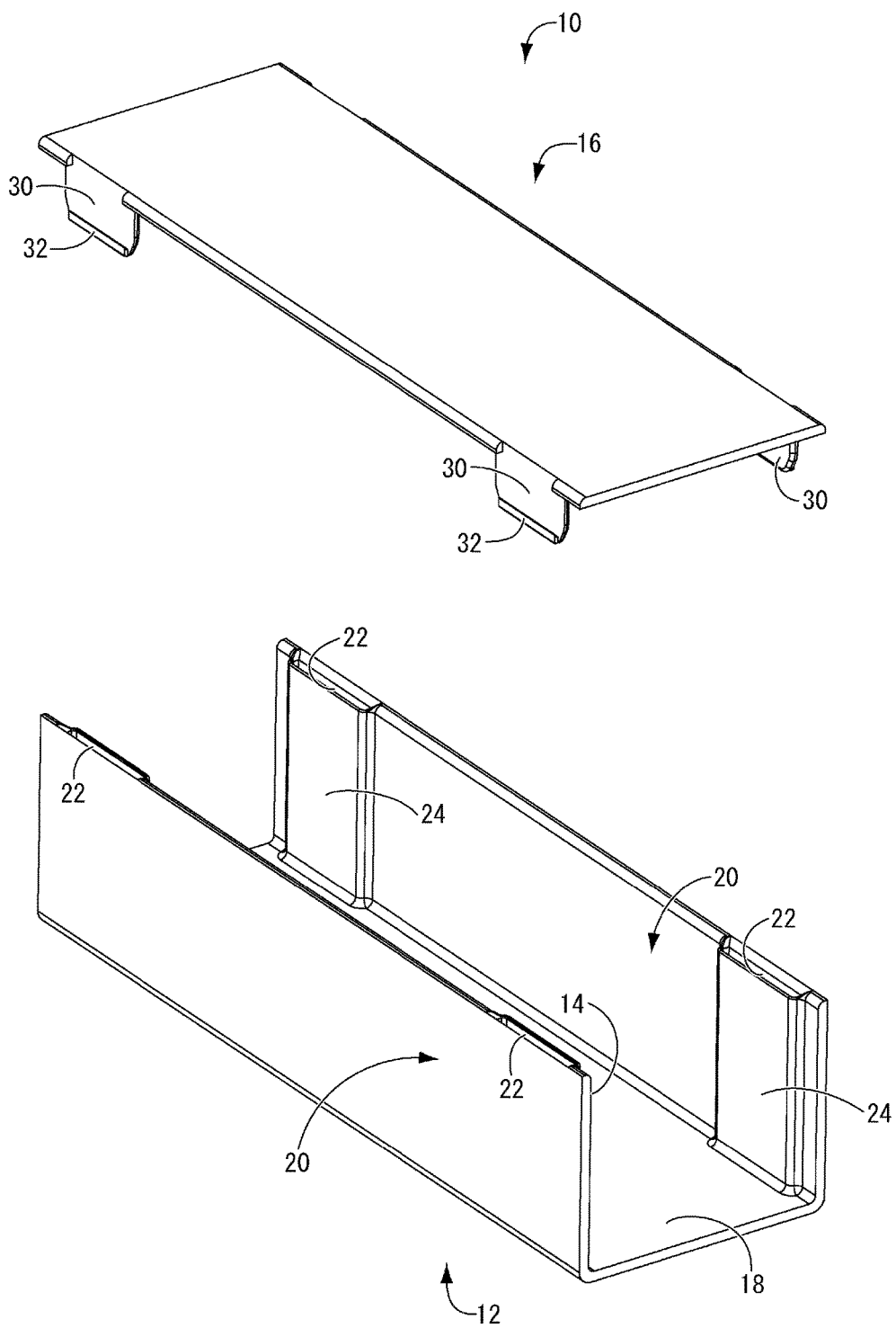
FIG. 2 is an exploded perspective view of the wire housing protector of the present embodiment.
Figure 3:
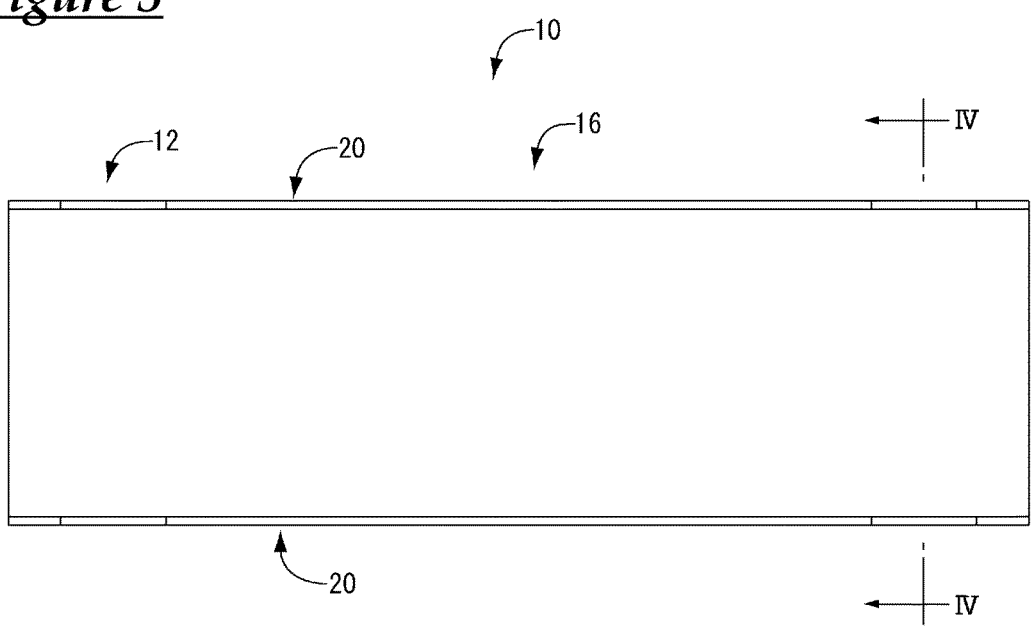
FIG. 3 is a plan view of the wire housing protector of the present embodiment.
Figure 4:
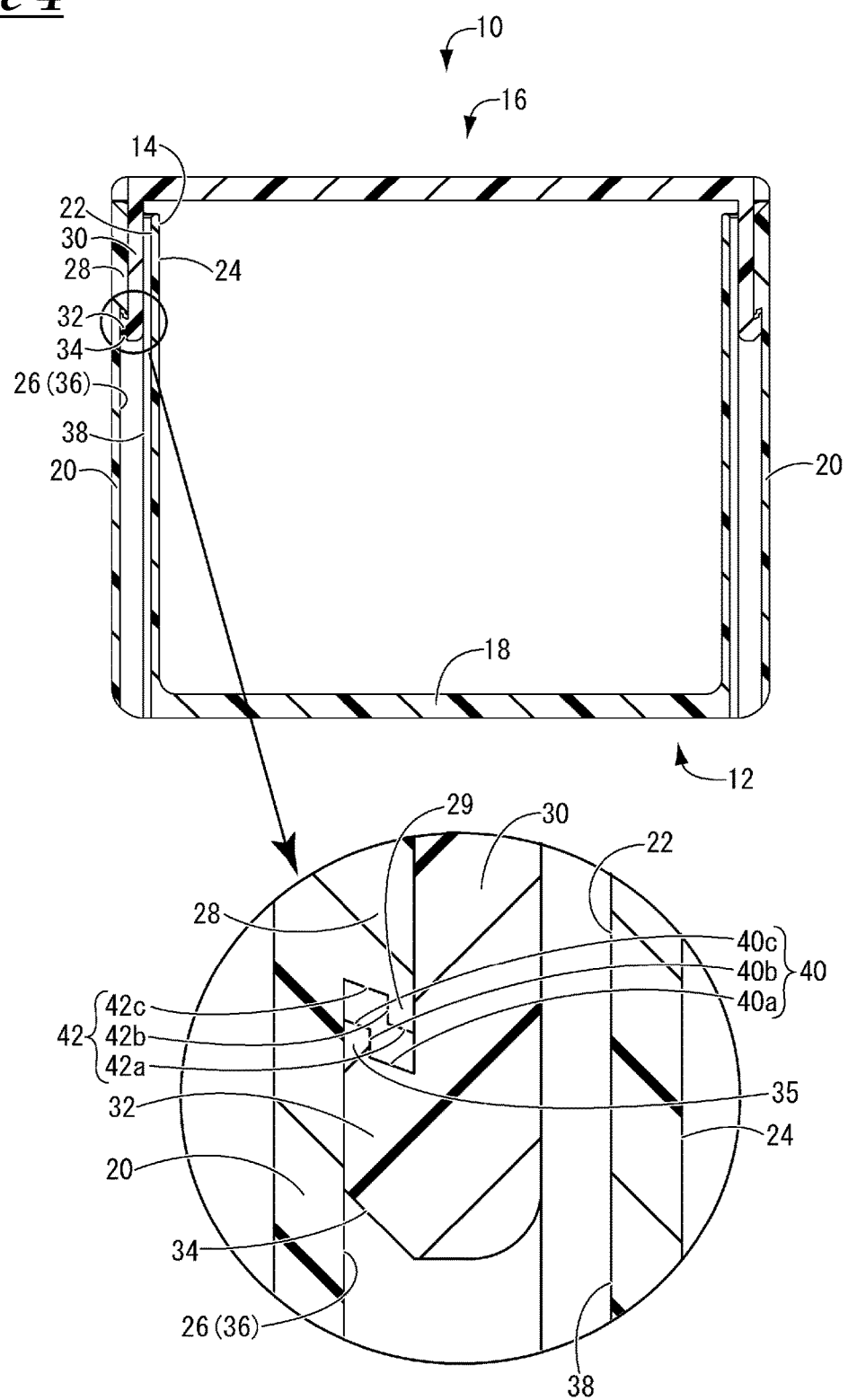
FIG. 4 is an enlarged cross section taken along line IV-IV in FIG. 3.

As shown in FIG. 2, the protector body 12 is configured to extend in the shape of a trough, includes a bottom wall 18 and a pair of sidewalls 20 rising upright from both sides of the bottom wall 18, and is integrally formed of synthetic resin such as polypropylene (PP) or polyamide (PA), for example, by injection molding or the like. Also, elastic projecting piece insertion portions 22 are formed in the side wall 20 of the protector body 12 by holes that extend inside the side wall 20 in a height direction and open in an upper surface of the side wall 20. In the present embodiment, two elastic projecting piece insertion portions 22 are formed in each of a back side and a front side of the side wall 20, but any number of elastic projecting piece insertion portions 22 that are separated in a longitudinal direction (left-right direction in FIG. 2) may be provided as necessary. Here, an inner surface 24 of the side wall 20 where the elastic projecting piece insertion portions 22 are formed slightly protrudes toward the inside of the protector body 12. Furthermore, as shown in FIG. 4, an engagement portion 28 is provided at an inner surface of the outer wall of the hole, that is, at an inner surface 26 of the elastic projecting piece insertion portion 22. In addition, a protrusion 29 that protrudes downward is provided at a lower end of the engagement portion 28 on a protrusion end side.

Meanwhile, as shown in FIG. 2, the lid 16 is provided with, at its outer edge, a plurality of elastic projecting pieces 30 that each have a substantially rectangular shape, project toward the protector body 12, and are flexible in a plate thickness direction. Also, an engagement protrusion 32 that protrudes outward in the plate thickness direction is provided on an outer surface at a leading end of the elastic projecting pieces 30. Furthermore, as shown in FIG. 4, a tapered surface 34 that slopes gradually outward from its lower end toward its upper end, in an assembling direction of the protector body 12 and the lid 16, is provided at a lower end of the engagement protrusion 32. In addition, a protrusion 35 that protrudes upward is provided at an upper end portion of the engagement protrusion 32 on its protrusion end side. Note that, in the present embodiment, four elastic projecting pieces 30 are formed in correspondence with the elastic projecting piece insertion portions 22 described above. Also, the lid 16 is, similarly to the protector body 12, integrally formed of synthetic resin such as polypropylene (PP) or polyamide (PA), for example, by injection molding or the like, but is formed separately from the protector body 12.

Figure 1:
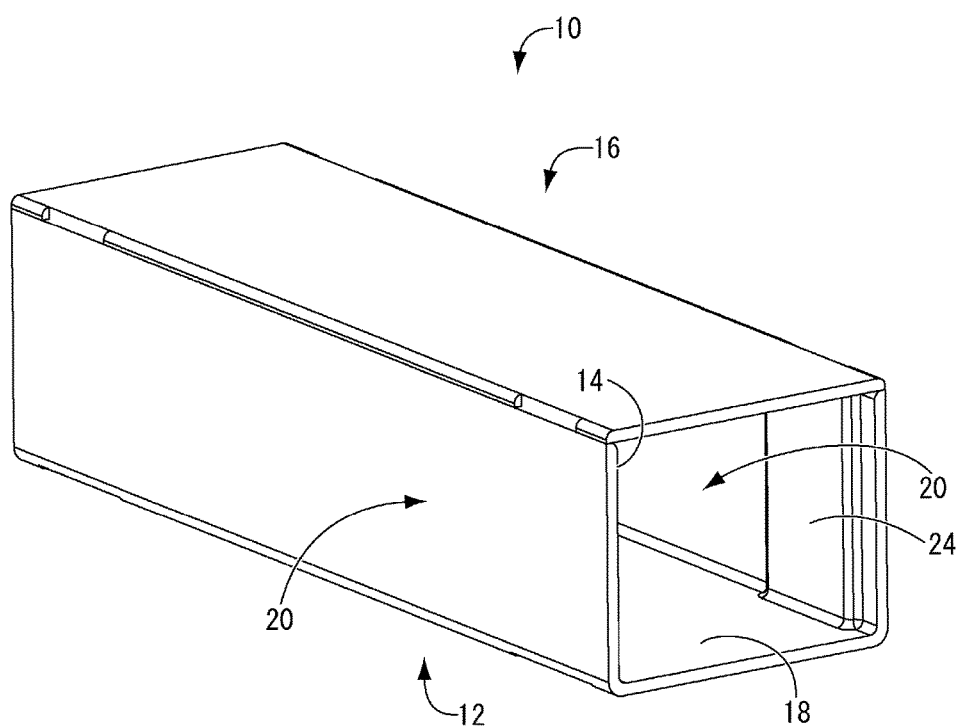
FIG. 1 is a general perspective view of a wire housing protector according to a first embodiment.

The plurality of elastic projecting pieces 30 of the lid 16 are inserted into the respectively corresponding plurality of elastic projecting piece insertion portions 22 of the protector body 12, the engagement portions 28 of the elastic projecting piece insertion portion 22 are respectively engaged with the engagement protrusions 32 of the elastic projecting pieces 30, and as a result, the lid 16 is fixedly held by the protector body 12 in the present embodiment, as shown in FIGS. 1 and 4. In this way, the locking mechanism is constituted by the engagement portions 28 of the elastic projecting piece insertion portions 22 and the engagement protrusions 32 of the elastic projecting pieces 30.

Next, with reference to FIG. 4, the locking mechanism will be described in detail. First, the leading end of the elastic projecting piece 30 of the lid 16 is inserted into the elastic projecting piece insertion portion 22. Because the lower end of the engagement protrusion 32 of the elastic projecting piece 30 is formed as the tapered surface 34, as a result of pushing the leading end of the elastic projecting piece 30 of the lid 16 deep into the elastic projecting piece insertion portion 22, the leading end of the elastic projecting piece 30 is inserted into the elastic projecting piece insertion portion 22 while the leading end is pressed toward the inner surface 24 side of the protector body 12, due to the tapered surface 34. Also, the engagement portion 28 is provided in an upper portion of the elastic projecting piece insertion portion 22 and protrudes from an inner side 36 of the outer wall toward an inner peripheral side inner surface 38 of the elastic projecting piece insertion portion 22. Therefore, when the elastic projecting piece 30 is further pushed deep into the elastic projecting piece insertion portion 22 and the engagement protrusion 32 formed at the leading end of the elastic projecting piece 30 passes over the engagement portion 28, the elastic projecting piece 30 undergoes elastic restoration, and the engagement protrusion 32 comes into contact with the inner side 36 of the outer wall of the elastic projecting piece insertion portion 22. Accordingly, the engagement protrusion 32 of the elastic projecting piece 30 is engaged with the engagement portion 28 of the elastic projecting piece insertion portion 22, and the lid 16 is fixedly held by the protector body 12.

In this engagement state, the upper surface of the engagement protrusion 32 of the elastic projecting piece 30 and the lower surface of the engagement portion 28 of the elastic projecting piece insertion portion 22 oppose each other in the assembling direction of the protector body 12 and the lid 16, and contact surfaces 40 and 42 are respectively constituted by the upper surface of the engagement protrusion 32 and the lower surface of the engagement portion 28. Specifically, the contact surfaces 40 and 42 are respectively constituted by, from the side wall 20 side of the protector body 12 (in a direction from the inside toward the outside of the protector body 12), first engagement surfaces 40a and 42a that extend obliquely upward toward the side in which the engagement protrusion 32 protrudes, second engagement surfaces 40b and 42b that extend vertically upward toward the lid 16 from the end portions of the first engagement surfaces 40a and 42a, and third engagement surfaces 40c and 42c that extend obliquely upward toward the protruding side of the engagement protrusion 32 from the end portions of the second engagement surfaces 40b and 42b. That is, the first engagement surfaces 40a and 42a and the third engagement surfaces 40c and 42c of the engagement protrusion 32 and the engagement portion 28 are sloping surfaces that slope obliquely downward toward the inside of the protector body 12.

Figure 5:
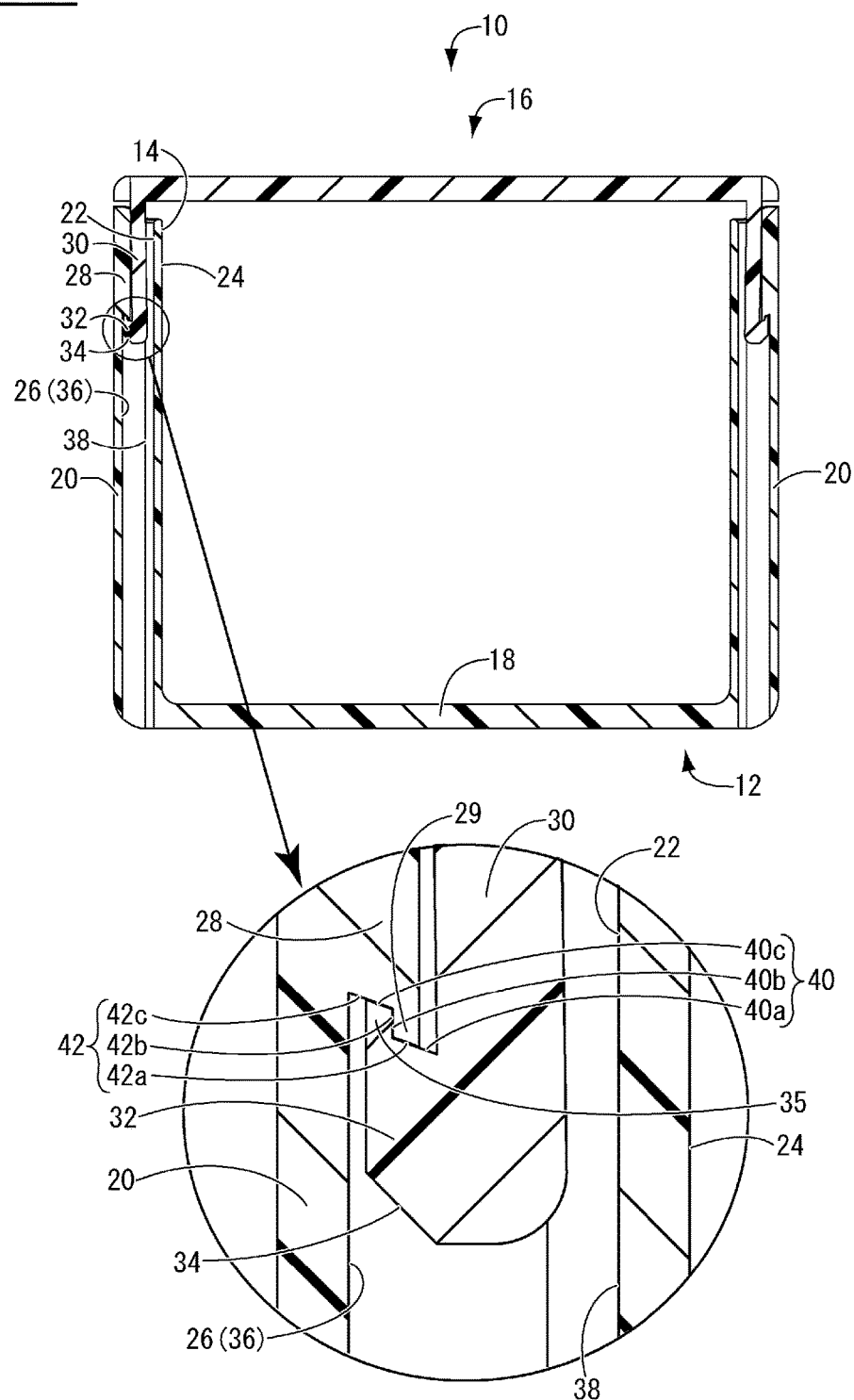
FIG. 5 is a cross-sectional view of the wire housing protector of the present embodiment illustrating a state in which an upward force is applied to the lid, which corresponds to FIG. 4.

According to the wire housing protector 10 of the present embodiment having such a structure, when an upward force is applied such that the elastic projecting piece 30 of the lid 16 separates from the elastic projecting piece insertion portion 22 of the protector body 12, the contact surfaces 40 and 42 of the engagement protrusion 32 of the elastic projecting piece 30 and the engagement portion 28 of the elastic projecting piece insertion portion 22 come into contact with each other, as shown in FIG. 5. In this contact state, the first engagement surfaces 40a and 42a of the contact surfaces 40 and 42 extend in a direction that is approximately orthogonal to the upward direction along which the elastic projecting piece 30 separates from the elastic projecting piece insertion portion 22, and as a result, stopping power can be exerted such that the separation of the lid 16 from the protector body 12 is inhibited. Also, the second engagement surfaces 40b and 42b that are respectively continuous to the first engagement surfaces 40a and 42a are surfaces that rise vertically upward toward the lid 16 side, and as a result, stopping power is exerted such that the displacement of the elastic projecting piece 30 toward the inside of the protector body 12 is inhibited, and the separation of the elastic projecting piece 30 from the elastic projecting piece insertion portion 22 can be advantageously inhibited. Furthermore, the third engagement surfaces 40c and 42c that are respectively continuous to the second engagement surfaces 40b and 42b extend in a direction that is approximately orthogonal to the upward direction along which the elastic projecting piece 30 separates from the elastic projecting piece insertion portion 22, similarly to the first engagement surfaces 40a and 42a, and as a result, stopping power can be stably exerted such that the separation of the lid 16 from the protector body 12 is inhibited on both sides of the second engagement surfaces 40b and 42b. Moreover, compared with a conventional case where a structure in which the engagement protrusion 32 engages with the engagement portion 28 further outward than the second engagement surfaces 40b and 42b is not adopted, the contact area between the engagement protrusion 32 and the engagement portion 28 can be increased, and as a result, the stability of engagement between the engagement protrusion 32 and the engagement portion 28 can further be securely improved. Also, the third engagement surfaces 40c and 42c of the engagement protrusion 32 and the engagement portion 28 are provided using a dead space above the protrusion 35 that defines the second engagement surfaces 40b and 42b that are already adopted in a structure disclosed in Patent Document 2, and as a result, the retaining force of the locking mechanism can be improved without increasing the overall size, and the demand for saving space can be advantageously dealt with.

In addition, the first engagement surfaces 40a and 42a and the third engagement surfaces 40c and 42c of the engagement protrusion 32 and the engagement portion 28 are sloping surfaces that slope obliquely downward toward the inside of the protector body 12. Therefore, when an upward force is applied in a direction separating the elastic projecting piece 30 of the lid 16 from the elastic projecting piece insertion portion 22 of the protector body 12, forces that cause the second engagement surfaces 40b and 42b to approach each other are generated on both sides of the second engagement surfaces 40b and 42b by component forces of the force that is applied due to the sloping surfaces. Accordingly, the second engagement surfaces 40b and 42b come into contact more securely, and a stopping power for inhibiting a displacement of the elastic projecting piece 30 toward the inside of the protector body 12 is exerted, and as a result, the separation of the elastic projecting piece 30 from the elastic projecting piece insertion portion 22 can be more securely inhibited, and the improvement of the retaining force of the locking mechanism can be more advantageously realized.

In particular, the elastic projecting piece insertion portion 22 is formed by a hole that extends inside the side wall 20 of the protector body 12 in the height direction and opens in the upper surface of the side wall 20. As a result, the side wall 20 of the protector body 12 can be extended to a maximum range of the space that is allowed to mount the wire housing protector 10, compared with a conventional structure in which the elastic projecting piece insertion portion 22 protrudes outward from the side wall 20 of the protector body 12 in a frame shape, as disclosed in Patent Document 2. Note that, when the elastic projecting piece insertion portion 22 is provided inside the side wall 20 of the protector body 12, the sizes of the engagement protrusion 32 and the engagement portion 28 are limited. However, even in a case where a relatively small engagement protrusion 32 and engagement portion 28 are provided in such a small space, the contact surfaces 40 and 42 of the respective engagement protrusion 32 and the engagement portion 28 are respectively constituted by the first to third engagement surfaces 40a to 40c and the first to third engagement surfaces 42a to 42c, and as a result, the stability of the engagement between the engagement protrusion 32 and the engagement portion 28 can be sufficiently improved, and a locking mechanism having a strong retaining force constituted by the engagement portion 28 of the elastic projecting piece insertion portion 22 and the engagement protrusion 32 of the elastic projecting piece 30 can be arranged in a small space.

Next, a wire housing protector 46 according to a second embodiment of the present design will be described in detail with reference to FIG. 6. Members and portions having a structure similar to those in the above embodiment will be denoted in this figure by the same reference signs as in the above embodiment, thereby omitting detailed descriptions for them. The present embodiment is different from the first embodiment in that, in the wire housing protector 46, the second engagement surfaces 40b and 42b of the respective engagement protrusion 32 and the engagement portion 28 are configured to extend obliquely outward toward the lid 16 side from the respective end portions of the first engagement surfaces 40a and 42a.

According to the present embodiment, since the second engagement surfaces 40b and 42b are configured to extend obliquely outward toward the lid 16 side, the contact area between the second engagement surfaces 40b and 42b of the engagement protrusion 32 and the engagement portion 28 can be increased compared with the case where these surfaces are configured to extend vertically upward, as in the first embodiment, and as a result, the stability of engagement between the engagement protrusion 32 and the engagement portion 28 can be further improved.

Next, a wire housing protector 50 according to a third embodiment of the present design is shown in FIG. 7. The present embodiment is different from the first embodiment in that, in the wire housing protector 50, first to third engagement surfaces 52a, 52b, and 52c that constitute a contact surface 52 of the engagement protrusion 32 of the elastic projecting piece 30 and first to third engagement surfaces 42a, 42b, and 42c that constitute a contact surface 42 of the engagement portion 28 of the elastic projecting piece insertion portion 22 are all formed to have a corrugated cross-sectional shape.

According to the present embodiment, the first to third engagement surfaces 52a, 52b, and 52c that constitute the contact surface 52 of the engagement protrusion 32 of the elastic projecting piece 30 and the first to third engagement surfaces 42a, 42b, and 42c that constitute the contact surface 42 of the engagement portion 28 of the elastic projecting piece insertion portion 22 are all formed to have a corrugated cross-sectional shape. When an upward force is applied such that the elastic projecting piece 30 separates from the elastic projecting piece insertion portion 22, a force to cause the first to third engagement surfaces 52a, 52b, and 52c and the first to third engagement surfaces 42a, 42b, and 42c to respectively approach each other is generated, and the first to third engagement surfaces 52a to 52c, which each have a corrugated cross-sectional shape, are respectively fitted to the first to third engagement surfaces 42a to 42c, which each have a corrugated cross-sectional shape. Therefore, when the engagement protrusion 32 engages with the engagement portion 28, the contact area between the engagement protrusion 32 and the engagement portion 28 can be advantageously increased, and the force of retaining engagement between the engagement protrusion 32 and the engagement portion 28 can further be increased. As a result, a locking mechanism in which the retaining force is increased can be advantageously provided even in a small arrangement space without increasing the size of the protector.

Although embodiments of the present design have been described in detail above, the present invention is not limited by these specific descriptions. For example, although, in the third embodiment described above, the first to third engagement surfaces 52a, 52b, and 52c that constitute the contact surface 52 of the engagement protrusion 32 of the elastic projecting piece 30 and the first to third engagement surfaces 42a, 42b, and 42c that constitute the contact surface 42 of the engagement portion 28 of the elastic projecting piece insertion portion 22 are all formed to have a corrugated cross-sectional shape, it is sufficient that at least one pair of engagement surfaces out of a pair of first engagement surfaces 52a and 42a, a pair of second engagement surfaces 52b and 42b, and a pair of third engagement surfaces 52c and 42c have a corrugated cross-sectional shape (the pair of first engagement surfaces 52a and 42a, for example).

Also, the shapes of the elastic projecting piece insertion portion 22 and the elastic projecting piece 30 that constitutes the locking mechanism are not limited to the shapes described in the first embodiment, and any known shape can be adopted. It is sufficient that the structure in which the contact surface is constituted by three engagement surfaces is applied to an engagement portion of an elastic projecting piece insertion portion and an engagement protrusion of an elastic projecting piece having such shapes. For example, it is sufficient that the first engagement surfaces 40a, 42a, and 52a and the third engagement surfaces 40c, 42c, and 52c extend toward the protruding side of the engagement protrusion 32, and these surfaces may extend in a direction orthogonal to the direction in which the elastic projecting piece 30 separates from the elastic projecting piece insertion portion 22, or may slope obliquely downward toward the inside of the protector body 12 as illustrated. Furthermore, the sloping angles of the first engagement surfaces 40a, 42a, and 52a may be different from the respective sloping angles of the third engagement surfaces 40c, 42c, and 52c. Also, it is sufficient that the second engagement surfaces 40b, 42b, and 52b extend toward the lid 16, and these surfaces may slope obliquely downward toward the inside more steeply than the first engagement surfaces 40a, 42a, and 52a and the third engagement surfaces 40c, 42c, and 52c, may rise vertically upward as illustrated, or may slope obliquely downward toward the outside.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS 10, 46, 50: Wire housing protector
12: Protector body
14: Upper opening
16: Lid 20: Side wall
22: Elastic projecting piece insertion portion (locking mechanism)
24: Inner surface
26: Inner surface
28: Engagement portion
30: Elastic projecting piece (locking mechanism)
32: Engagement protrusion
40, 52: Contact surface (engagement protrusion)
40a, 52a: First engagement surface
40b, 52b: Second engagement surface
40c, 52c: Third engagement surface
42: Contact surface (engagement portion)
42a: First engagement surface
42b: Second engagement surface
42c: Third engagement surface

The invention claimed is:

1. A wire housing protector comprising:
a protector body extending in the shape of a trough;
a lid for covering an upper opening of the protector body; and
a locking mechanism for fixedly holding the protector body and the lid, wherein the locking mechanism includes:
an elastic projecting piece that protrudes from the lid and is provided with an engagement protrusion on an outer surface of its leading end; and
an elastic projecting piece insertion portion that is provided in a side wall of the protector body, and includes an engagement portion that engages with the engagement protrusion,
wherein the wire housing protector is configured such that the elastic projecting piece can be inserted into the elastic projecting piece insertion portion while the leading end of the elastic projecting piece is pressed toward an inner surface side, and when the elastic projecting piece elastically returns, the engagement protrusion engages with the engagement portion and the lid is held by the protector body,
wherein contact surfaces of the engagement protrusion and the engagement portion each include a first engagement surface that extends in a direction from the inside toward the outside of the protector, a second engagement surface that extends from an end portion of the first engagement surface toward the lid side, and a third engagement surface that extends from an end portion of the second engagement surface toward the side to which the engagement protrusion protrudes, and
wherein at least one pair of engagement surfaces out of a pair of the first engagement surfaces, a pair of the second engagement surfaces, and a pair of the third engagement surfaces of the engagement protrusion and the engagement portion have a corrugated cross-sectional shape.

2. The wire housing protector according to claim 1, wherein the first engagement surfaces and the third engagement surfaces of the engagement protrusion and the engagement portion are surfaces that slope obliquely downward toward the inside of the protector body.

3. The wire housing protector according to claim 1, wherein the elastic projecting piece insertion portion is constituted, in the side wall of the protector body, by a hole that extends inside the side wall in a height direction and opens in an upper surface of the side wall, and the engagement portion is provided on an inner surface of an outer wall of the hole.

* * * * *